Dec. 10, 1957 G. E. ISING ET AL 2,815,534
PROCESS FOR MAKING A CLOSED ONE-PIECE REINFORCED PLASTIC TANK
Filed July 12, 1954 2 Sheets-Sheet 1
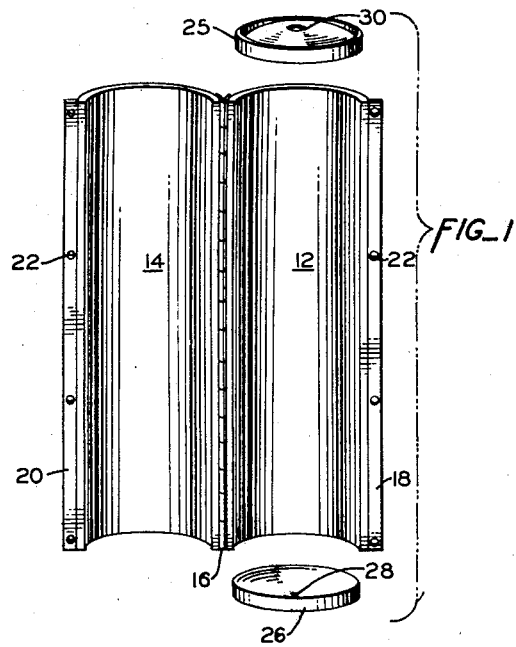
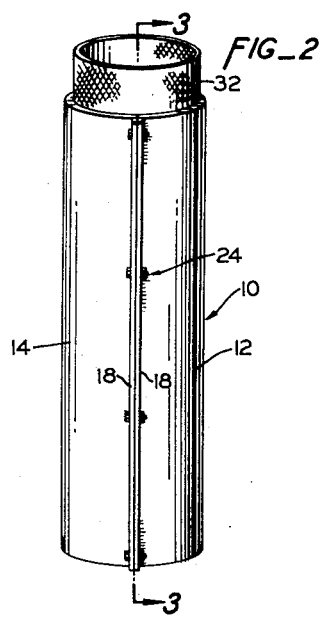
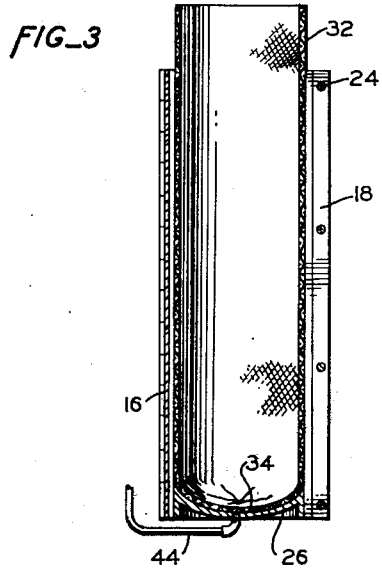
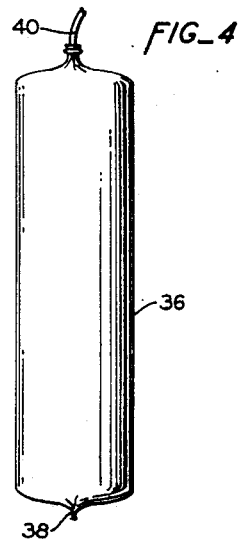
INVENTORS
GEORGE E. ISING
THEODORE K. ALLEN
ATTORNEYS

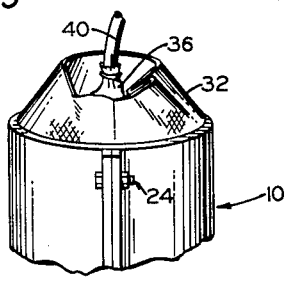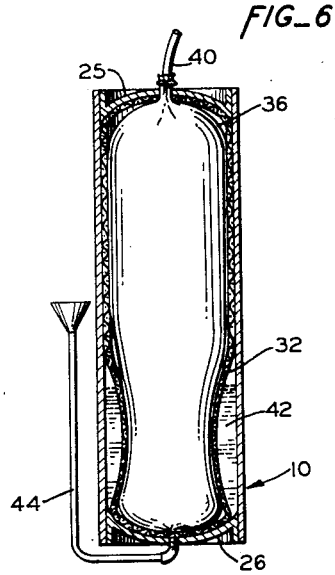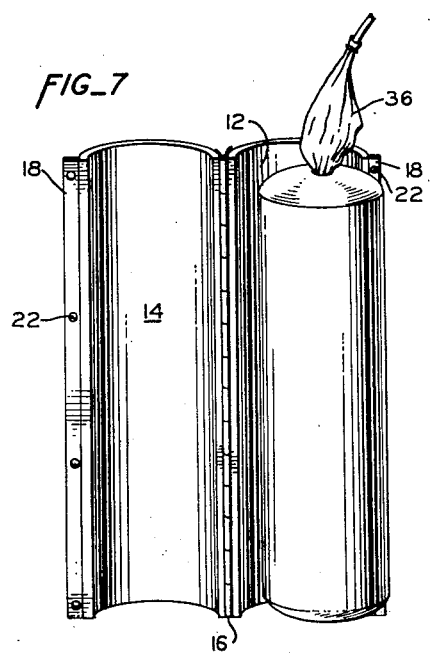

United States Patent Office 2,815,534
Patented Dec. 10, 1957

2,815,534

PROCESS FOR MAKING A CLOSED ONE-PIECE REINFORCED PLASTIC TANK

George Earl Ising, Livermore, and Theodore K. Allen, Tracy, Calif.

Application July 12, 1954, Serial No. 442,562

7 Claims. (Cl. 18—58)

This invention relates to the molding art, and more particularly to a process for making a one-piece molded container, such as a reinforced plastic tank. The tanks or containers made in accordance with the subject process are particularly adapted for use with fluids which have a corrosive effect on metal tanks and containers.

The essential object of the present invention is to provide a process whereby a one-piece reinforced plastic tank suitable for commercial and industrial use may be simply and economically produced.

Other objects and advantages of the invention will be either expressly set forth or will be made apparent in the following description taken in conjunction with the drawing forming part of this specification, and in which:

Figure 1 is a view in perspective of a form of mold that may be employed in the subject process, said mold being shown in an open position with the top and bottom head members in disassembled relation thereto;

Figure 2 is a view in perspective of the mold in closed position with the plastic reinforcement material disposed therein;

Figure 3 is a view in section taken along lines 3—3 of Figure 2;

Figure 4 is a view in elevation of the bag-type envelope employed in the molding process;

Figure 5 is a detailed view in perspective of the upper part of the mold, with the envelope of Figure 4 being disposed therein and with the top portion of the reinforcing material being shown in a semi-folded down position;

Figure 6 is a view in diametral cross section of the mold assembly showing the elements thereof at the beginning of the actual molding operation; and Figure 7 is a view in perspective showing a finished tank and open mold and illustrating the manner of removing the pressure envelope from the molded tank.

With reference to the drawings, and by way of example of the equipment that may be employed in the subject process, the mold 10 is comprised of semi-cylindrical half portions 12 and 14 having a hinge connection 16, mating flange elements 18 and 20 provided with alinable apertures 22 adapted to receive mold securing means 24. The mold further comprises top and bottom head members 25 and 26. The bottom head member 26 is press-fitted into the lower end of the mold upon the closing of the mold halves 12 and 14 and the top head member 25 is press fitted into place either before or during the actual molding operation, as will hereinafter appear. The bottom head member 26 may be provided with a centrally disposed threaded aperture 28, if it be desired that the moldable material be introduced into the mold through this head member, while the top head member is provided with a somewhat larger centrally disposed aperture 30.

Once the mold halves 12 and 14 and bottom head member 26 have been assembled in closed position, the next step in the subject process is the introduction into the mold of one or more cylindrically disposed layers of reinforcement material 32. The reinforcement layer or layers 32 may be formed of any material which may be either completely saturated with the plastic or resin molding material or which has the property of becoming fully enclosed by the molding material. Preferred and conventional reinforcement materials are fiber glass or burlap. The reinforcement insert is formed to have a substantially closed lower end 34, as by providing the reinforcement cylinder at its lower end with a plurality of spaced and longitudinally extending slits, folding the tongues formed between said slits toward each other and into overlapping relation, and adhesively, or otherwise, securing the overlapped tongues together.

The next step in the process, and as will hereinafter appear the sequence of steps following the insertion of the reinforcement material into the mold may be varied, is the placement within the mold and within the reinforcement insert 32 of an envelope or bag 36 having a closed lower end 38 and having associated with the upper end conduit lead 40 whereby a pressure medium may be introduced into the envelope to effect the actual molding operation. It is desirable that the envelope 36 have the following characteristics: sufficient wall thinness, and hence a sufficiently low bulk, to enable its withdrawal through the aperture 30 of the top head member 25 after the molding operation has been completed; sufficient strength to withstand the internal pressure used in the molding operation; and resistance to both chemical attack by the molding material and to the temperatures that may be reached in the molding process. The following materials have been satisfactorily employed for the making of the envelope 36: rubber; polyethylene film; Mylar, a polyester film manufactured by E. I. du Pont de Nemours & Co. of Delaware; and Saran, a polymer manufactured by Dow Chemical Co. of Midland, Michigan.

Following the insertion of the envelope 36 into the mold, the upper end of the mold is closed by folding the upper end of the reinforcement material 32 inwardly and downwardly, as shown in Figure 5, and by then press-fitting the top head member 25 of the mold in place.

Next, a predetermined volume of resin material 42 is introduced into the mold, as for example, through a conduit 44, connected into aperture 28 formed in the bottom head member 26. The resin material may either consist of a room temperature setting composition, i. e. one which will set or cure under the action of pressure alone, or may be a thermo-setting composition. By way of example, a resin that has been fully satisfactorily employed is "Duolite Polyester 364," manufactured by the Chemical Process Co. of Redwood City, California. A thermo-setting composition comprising this resin and 1% benzoyl peroxide is preferred, and it is further preferred that the pre-formed tank or container be later subjected to a curing temperature of approximately 175° F. in a hot air oven.

Following the introduction of the resin into the mold, the line 44 is disconnected from the mold and a plug is then inserted in head member aperture 28 preparatory to the introduction of a pressure medium or media into the envelope 36.

The pressure medium or media introduced into the envelope 36 may consist of a gas, solid, liquid, or combinations of these phases of matter. For example, air has been successfully employed. Among the solids that have been successfully employed are: lead shot; and sand. The following liquids have been suitably employed: water; and perchlorethylene. The most satisfactory pressure medium that has been employed is a semi-fluid mud comprising fire clay mixed to the consistency of heavy mortar.

An important concept underlying the preferred mode of applying pressure within the mold during the molding operation is that the resin be forced slowly upwardly by the liquid or solid pressure medium so that the level of the resin precedes the level of the pressure medium, thus substantially eliminating the possibility of the formation of air pockets and dry spots in the side walls of the molded container, such as might occur upon an abrupt buildup in pressure throughout the entire envelope. Thus, the liquid or solid pressure additive, to be effective for the mentioned purpose, should have a higher specific gravity than that of the moldable material or resin. The liquid or solid pressure additive may only be added up to a certain level, at which point it will be fairly certain that the subsequent filling out of the envelope will result in a molded container having no appreciable wall defects, as above mentioned, followed by the application of air pressure to the envelope for the finalizing of the pre-forming step of the molding operation. The thermo-setting step of the process is then carried out while the envelope 36 is maintained under the molding pressure, and in this connection it is to be pointed out that both the preforming step and the thermo-setting step may be combined, in effect, by utilizing heated gas or heated liquid, or combinations thereof, as the pressure medium.

After the resin has become thermally set or cured, the mold is opened, the pressure condition within the envelope is released, the solid or liquid within the envelope is removed by inverting the molded container and emptying such material out, and the envelope itself is removed through aperture 30 of the top head member 25 of the mold. Holes may then be drilled or tapped into the molded container or tank to accommodate such fittings or connections as may be desired.

As above mentioned, the order of steps in the molding operation may be varied. For example, in the event that a liquid or a solid is employed as the starting pressure medium, the mold may be left in the semi-open condition of Figure 2 until the resin has been forced substantially completely up the side walls of the mold, following which the mold is closed in the manner described and the final, or gas, pressure medium is applied. Also, the resin may be introduced through the top of the semi-open mold before the pressure envelope 36 is introduced into the mold, following which comes the introduction of the envelope, the introduction of the liquid or solid pressure medium into the envelope until the resin has reached the desired pre-form level, followed by the closing of the mold and the application of the final pressure medium.

It is desirable from the standpoint of obtaining an end product of optimum quality that the following techniques be followed: the resin, following mixing, should be allowed to stand for a sufficient period of time to enable substantial full dissipation of the air bubbles therefrom before it is introduced into the mold; the resin should be heated to a temperature of approximately 100° F. to reduce its viscosity and thereby enable faster escape of any entrapped air bubbles and faster penetration of the resin into the reinforcing material after the resin is introduced into the mold; the mold heads 25 and 26 should be provided with perforations of the order of 1/32nd of an inch in diameter to not only enable any residual entrapped air in the resin to pass therethrough, but, more importantly, to enable a run-off of excess resin at the bottom and top of the mold, said apertures being sufficiently small to prevent resin run-off to the point where complete saturation of the reinforcing material and distribution of the resin within the mold is hampered.

What is claimed is:

1. A method for molding a one-piece tank comprising confining within a stationary and vertically disposed mold corresponding in internal surface configuration to the external surface configuration of the tank to be molded a predetermined charge of liquid resin having setting properties in company with bladder means adapted upon pressure-induced expansion to cause said resin to be distributed over the internal surface of said mold, progressively laterally expanding said bladder means from the bottom toward the top thereof to effect a gradual raising of the level of said resin with respect to the internal surface of said mold, subjecting said bladder means to a final and uniform pneumatic pressure condition, and maintaining said pressure condition while causing said resin to set.

2. A method for molding a hollow one-piece article comprising constraining a charge of liquid material which is moldable under the application of heat and pressure within a mold corresponding in internal shape to the shape of the article to be molded and disposing within said mold an expansible envelope adapted upon full expansion within said mold to cause said resin to assume the shape of said article, gradually causing said resin to be displaced upwardly within said mold by gravitationally flowing into said envelope a quantity of material having a higher specific gravity than that of said moldable material, thereafter subjecting said envelope to a uniform internal pressure to fully expand said envelope, and maintaining said uniform internal pressure condition while causing said resin to set in a finally molded condition.

3. A method for molding a hollow one-piece article comprising introducing a charge of liquid material which is moldable under the application of heat and pressure into a mold corresponding in internal shape to the shape of the article to be molded, and gradually displacing said liquid material upwardly within said mold by gravitationally flowing into said mold a quantity of material having a higher specific gravity than that of said liquid material while maintaining said quantity of material out of direct physical contact with said liquid material.

4. A method for molding a hollow one-piece article comprising introducing a predetermined charge of liquid material which is moldable under conditions of heat and temperature into a mold corresponding in internal shape to the shape of the article to be molded, and displacing said liquid material relatively slowly upwardly within said mold by gravitationally flowing into an expansible envelope disposed substantially centrally within said mold a quantity of material having a higher specific gravity than that of said liquid material.

5. A method for molding a hollow one-piece article as set forth in claim 4 comprising the further steps of ceasing to flow said material into said envelope when said envelope is less than full of said material, and thereafter completing the expansion within said mold of said envelope by placing said envelope under pneumatic pressure.

6. A method of molding a one-piece closed cylindrical tank comprising disposing within a mold and adjacent the walls thereof at least one layer of fibrous material having the property of being able to reinforce a resin molding material, flowing a predetermined charge of liquid resin molding material into said mold, introducing an expansible envelope into said mold within said layer of fibrous material, initially and partially expanding said envelope from the lower end thereof toward the top end thereof by gravitationally flowing into said envelope a quantity of material having a higher specific gravity than that of said resin material, finally and fully expanding said envelope pneumatically, and maintaining said envelope fully expanded while curing said resin material.

7. In a molding process for the formation of hollow plastic articles reinforced by fibrous material, a method for impregnating the fibrous material with the plastic to be reinforced comprising the steps of disposing within a mold and adjacent the walls thereof at least one layer of fibrous material, introducing an expansible envelope into said mold within said layer of fibrous material, flowing an amount of liquid plastic, sufficient to fully impregnate said fibrous material, into said mold and outside of said envelope, and causing said liquid plastic to move upwardly through said fibrous material by introducing into said envelope material having a higher specific gravity than that of said liquid plastic.

References Cited in the file of this patent
UNITED STATES PATENTS

| | | |
|---|---|---|
| 753,959 | Crump | Mar. 8, 1904 |
| 1,637,708 | Porter | Aug. 2, 1927 |
| 2,309,865 | Reach | Feb. 2, 1943 |
| 2,633,605 | Brucker | Apr. 7, 1953 |
| 2,644,198 | Crawford | July 7, 1953 |